United States Patent [19]

Capurka et al.

[11] Patent Number: 5,247,440
[45] Date of Patent: Sep. 21, 1993

[54] LOCATION INFLUENCED VEHICLE CONTROL SYSTEM

[75] Inventors: Zbynek A. Capurka, Palatine; John E. Herrmann, Mundelein, both of Ill.

[73] Assignee: Motorola, Inc., Schaumburg, Ill.

[21] Appl. No.: 695,052

[22] Filed: May 3, 1991

[51] Int. Cl.$^5$ .................. B60Q 1/04; G06F 15/50
[52] U.S. Cl. .................. 364/424.05; 364/449
[58] Field of Search .................. 364/449, 452, 424.05, 364/433, 569, 436, 440, 446; 340/469, 905, 988, 995, 996, 994; 307/10.1, 10.8; 315/82, 83; 362/71

[56] References Cited

U.S. PATENT DOCUMENTS

| | | | |
|---|---|---|---|
| 3,816,716 | 6/1974 | De Garmo | 364/446 |
| 3,824,534 | 7/1974 | Straumsnes | 340/996 |
| 4,045,769 | 8/1977 | Faller | 315/82 |
| 4,204,398 | 5/1980 | Lemelson | 368/21 |
| 4,216,530 | 8/1980 | Yamaki et al. | 364/446 |
| 4,220,946 | 9/1980 | Henriot | 340/994 |
| 4,665,321 | 5/1987 | Chang et al. | 307/101.8 |
| 4,785,463 | 11/1988 | Janc et al. | 364/443 |
| 4,791,572 | 12/1988 | Green, III et al. | 364/449 |
| 4,882,696 | 11/1989 | Nimura et al. | 364/449 |
| 5,014,206 | 5/1991 | Scribner et al. | 364/449 |
| 5,027,302 | 6/1991 | Asanuma et al. | 364/424.05 |
| 5,121,325 | 6/1992 | DeJonge | 364/446 |

OTHER PUBLICATIONS

*The Global Positioning System: Principals and Applications*, by Dr. Ira M. Weiss, Dec. 7, 1990.

*Development of a Standalone Navigation and Audio-Visual System (Multi-AV System)*, SAE Technical Paper Series, by Hisao Kishi, Takao Asami, Shinya, Ishikawa, and Toshiyuki Itoh, Nissan Motor Co., Ltd., Feb. 26–Mar. 2, 1990.

Magellan Systems Corporation, Magellan GPS NAV 1000 PRO, User Guide, pp. 4–27 through 4–34. These pages outline the interface and the navigation information presented through the RS-232 data port. ©1990.

*Primary Examiner*—Gary Chin
*Assistant Examiner*—Michael Zanelli
*Attorney, Agent, or Firm*—Phillip H. Melamed; John H. Moore

[57] ABSTRACT

The present invention provides for automatic control of the performance of a transportation vehicle based on the vehicle's geographic location. This is accomplished by determining the geographic location of the vehicle by employing a navigation system (107) and comparing its location output to a predetermined performance control requirement then modifying the control of the vehicle as a result. Such control modification includes control of a vehicle's lights by a vehicle lights controller (109).

10 Claims, 3 Drawing Sheets

LOCATION INFLUENCED VEHICLE CONTROL SYSTEM

FIELD OF THE INVENTION

This invention relates generally to the automated control of transportation vehicles based on geographic location, and specifically to the control of vehicle performance and also operating parameters based on such location.

BACKGROUND OF THE INVENTION

Currently transportation vehicles are typically designed to operate anywhere on the globe. To be practical the vehicle designer must make performance design tradeoffs based on the broad compromise this demands.

As a result, vehicles are not optimized to perform in any particular geographic region. While the manufacturer achieves the economy of scale benefit through this compromise, it penalizes the individual consumer. For example, in an automobile the engine control is calibrated to perform over broad environmental conditions. This includes operation ranging in temperature from arctic to desert conditions, in altitude from sea level to mountain top conditions and in relative humidity from desert to rain forest conditions. Therefore, a consumer who operates his vehicle predominantly in one local does not achieve benefit from an engine calibration that is optimized to his environment.

In another example, in order to comply with local law with regard to vehicle operating lights procedure, an operator must seek out the requirements of each jurisdiction as he travels. As well an operator has no automated notifying means if he is operating his vehicle outside of the constructs of local law. For instance in one region the local lay may require for safety reasons that the vehicle operating lights are activated 1 hour before sunset and left on 1 hour after sunrise. Other regions will have other requirements. It is impractical to conform to these local law requirements without the aid of an automated system.

SUMMARY OF THE INVENTION

The present invention encompasses a location influenced vehicle control system which controls vehicle performance by determining the geographic location of the vehicle and recalling a stored predetermined control requirement which is associated with the determined geographic location.

BRIEF DESCRIPTION OF THE DRAWINGS

The present invention will be effectively comprehended when read with the aid of the accompanying drawings in which.

DETAILED DESCRIPTION OF THE PREFERRED EMBODIMENT

A location influenced vehicle control system such as that presented in the preferred embodiment employs information provided through a navigation system to control a vehicle's performance based on the vehicle's location. The location influenced vehicle control system may include, but is not limited to, the control of an automotive vehicle's powertrain, chassis, or body system. An alternative embodiment includes application in a marine vehicle for control of running lights, or notify the vehicle operator if he is exceeding a local speed limit.

The location influenced vehicle control system allows the notification of the driver if he is operating the vehicle outside the limits set by local law. As well, the system allows the automated control of operating parameters and attributes such as vehicle lights, in order to operate within local law. Additional application, to compensate a powertrain controller for local altitude, will result in significantly improved emissions and power performance. Also, the system could automatically program the operator's radio with local broadcasting station selections suited to the operator's taste as he travels into a new local.

In a preferred embodiment, the operating lights of a vehicle are controlled by a location influenced vehicle control system, and such a specific embodiment is further referred to after herein as a location influenced vehicle lights control system.

Figure 1:
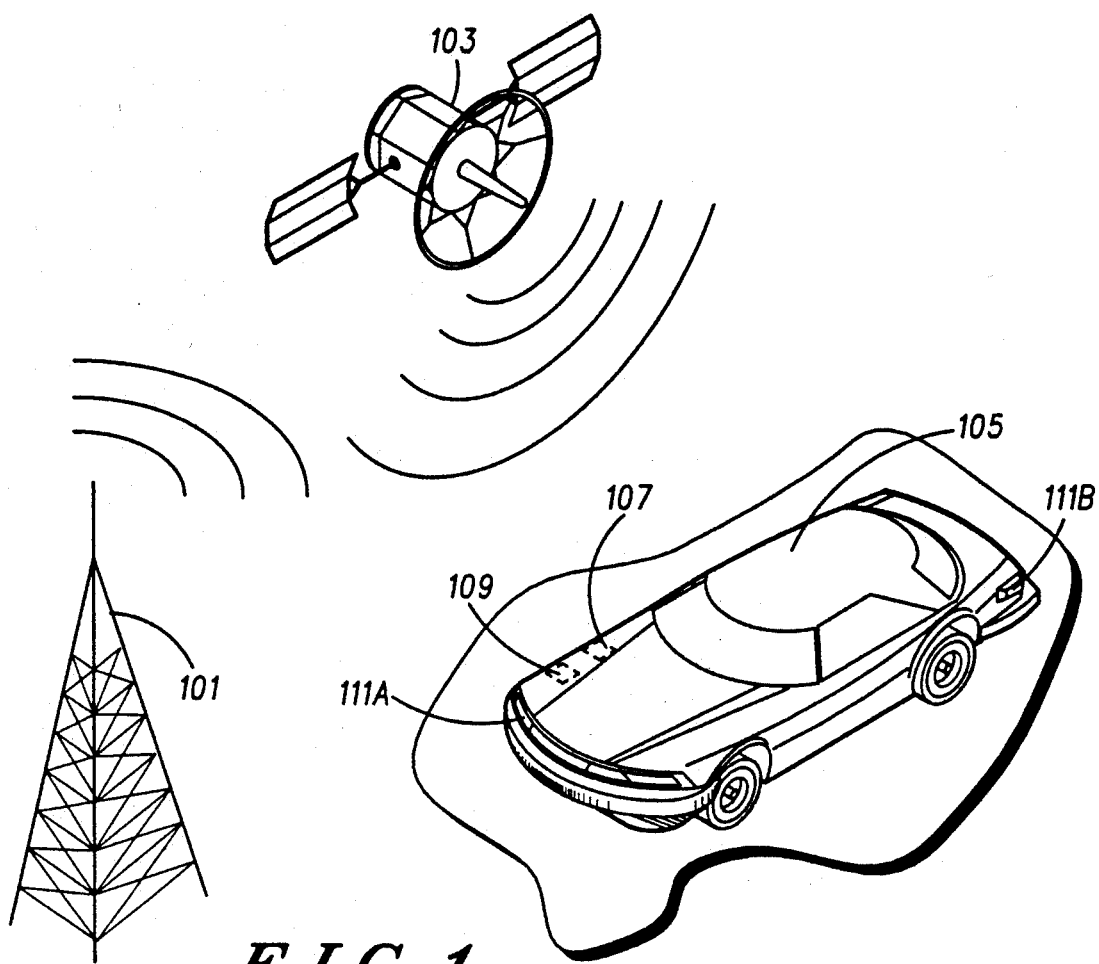
FIG. 1 is a concept diagram of a location influenced vehicle control system.

The location infuenced vehicle lights control system of the preferred embodiment is illustrated in FIG. 1, including a terrestrial based information source, 101 that transmits information to a space based communications transceiver, 103 that transmits information to a vehicle, 105. This vehicle has an integral navigation system, 107 a vehicle lights controller, 109 and a representative subset of the vehicle operating lights, 111a and 111b.

These vehicle operating lights, 111a and 111b are controlled by the vehicle operator through manipulation of operator switches and also by automated means through the action of the location influenced vehicle lights control system, 109.

Figure 2:
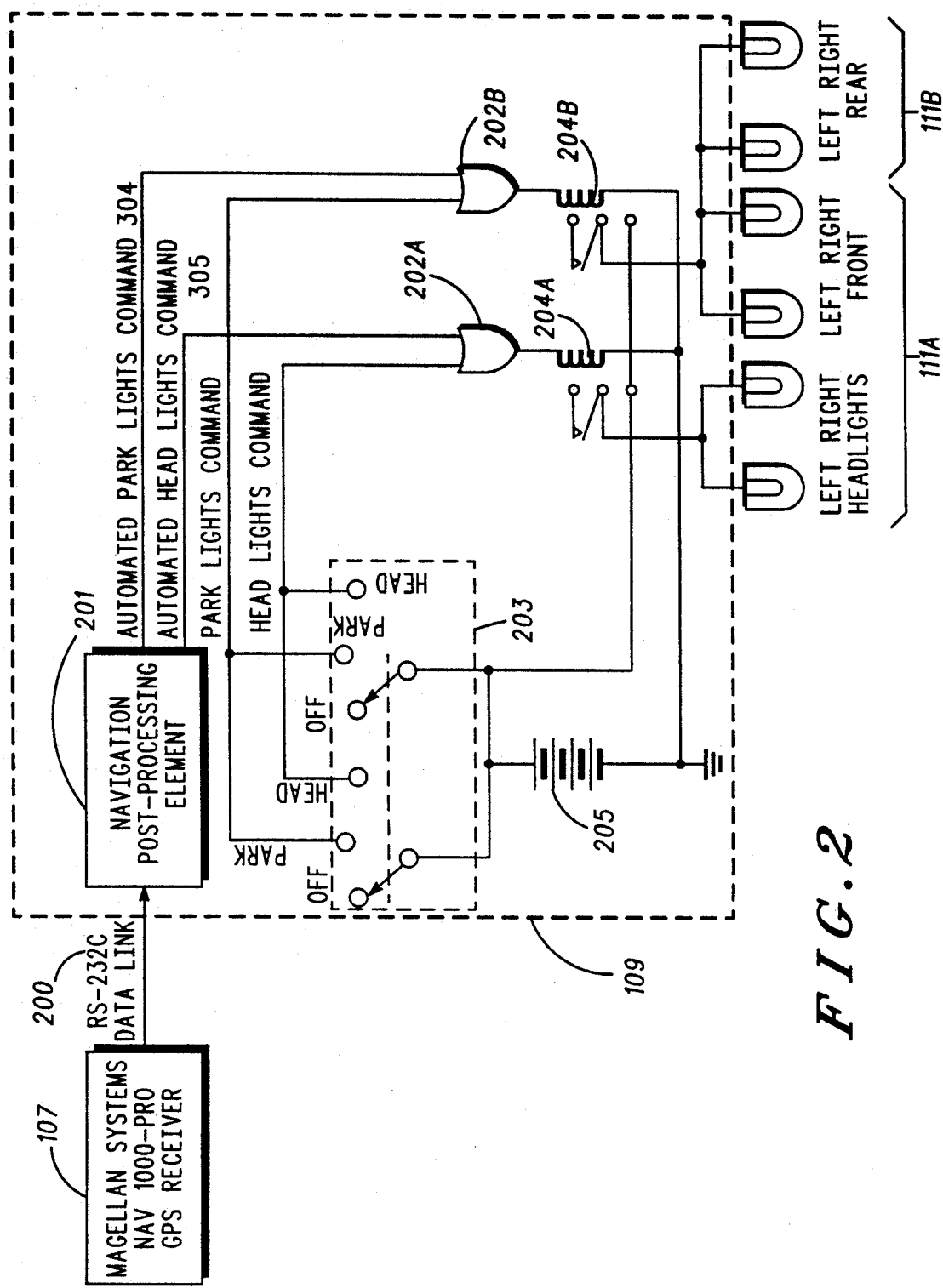
FIG. 2 is a block diagram of the on vehicle portion of a location influenced vehicle control system which may employ the present invention.

FIG. 2 expands the location influenced vehicle lights control system, 109 to further detail. It shows a NAV 1000 PRO Global Positioning System (GPS) receiver, 107 available from Magellan Systems Corporation located at 260 E. Huntington Drive, Monrovia, Calif. 91016 (818)-358-2363, employed as the navigation system. Other systems such as LORAN-C or other Intelligent Highway Vehicle Systems (IVHS) that embody a navigation system position determining means are also suitable for this function. This navigation system drives a vehicle lights controller, 109 through an RS-232 data link, 200. The vehicle lights controller, 109 is comprised of a navigation post processing element, 201 which outputs automated signals to a set of OR gates, 202a and 202b respectively. In addition a FORD #E90B-11654-AA park/headlamp switch assembly 203, provide the alternative input to the OR gates, 202a and 202b respectively. When commanded, by either the automated or manual action the OR gates, 202a and 202b respectively, drive Bosch #0-332-207100 type relays, 204a and 204b which switch Wagner #6054 type head lights, 111a and Wagner #1157 type park lights, 111b respectively. And finally the vehicle electrical power source, represented by the battery, 205 powers the head lights, 111a and park lights, 111b.

While the vehicle is operating, the navigation system, 107 receives the global position data and processes it into latitude, longitude, Universal Time, Universal Week, altitude, and velocity information. This information is presented to the vehicle lights controller, 109 through an RS-232 data link, 200.

Figure 3:
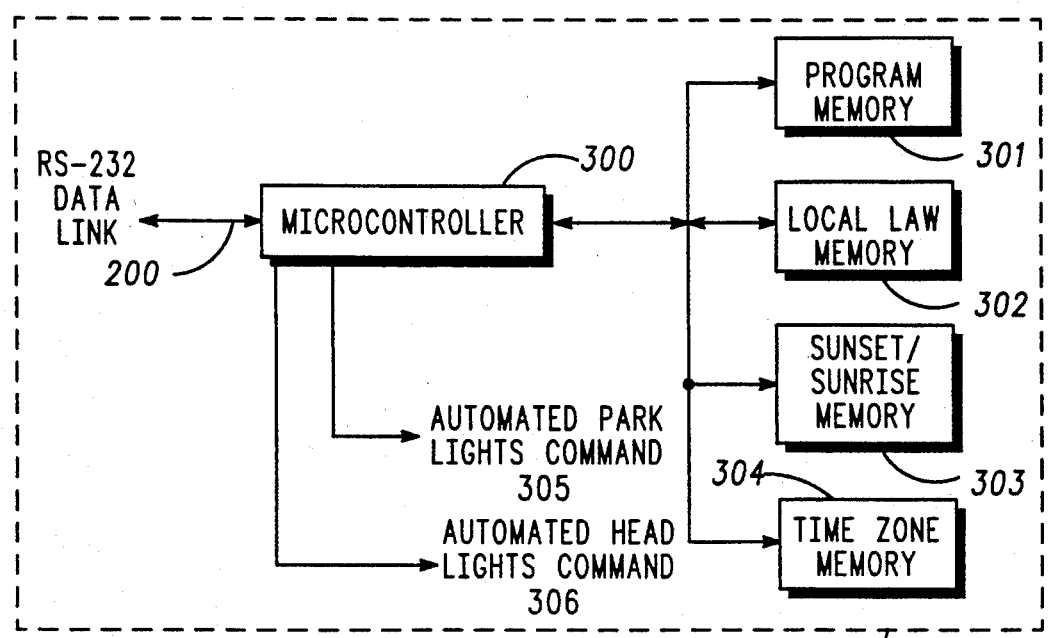
FIG. 3 is a block diagram of a navigation post processing element that determines the need for automated action as part of a location influenced vehicle control system employing the present invention.

Referring to FIG. 3, we see that the microcontroller, 300 in this case a Motorola MC68HC332, then reads this data, in this case geographic location represented by latitude, longitude, Universal Time, and Universal Week, for further navigation post processing. This navigation post processing element, 201 further includes a program memory, 301 which holds the executable strategy software, further described in FIG. 4, a local law memory, 302 which holds the law regarding vehicle operating lights for the jurisdictions of interest, the sunset/sunrise memory, 303 which holds the information representing the known sunset and sunrise information for each time zone, and the time zone memory, 304 which holds the time offset for geographic location including adjustments such as daylight savings time.

Figure 4:
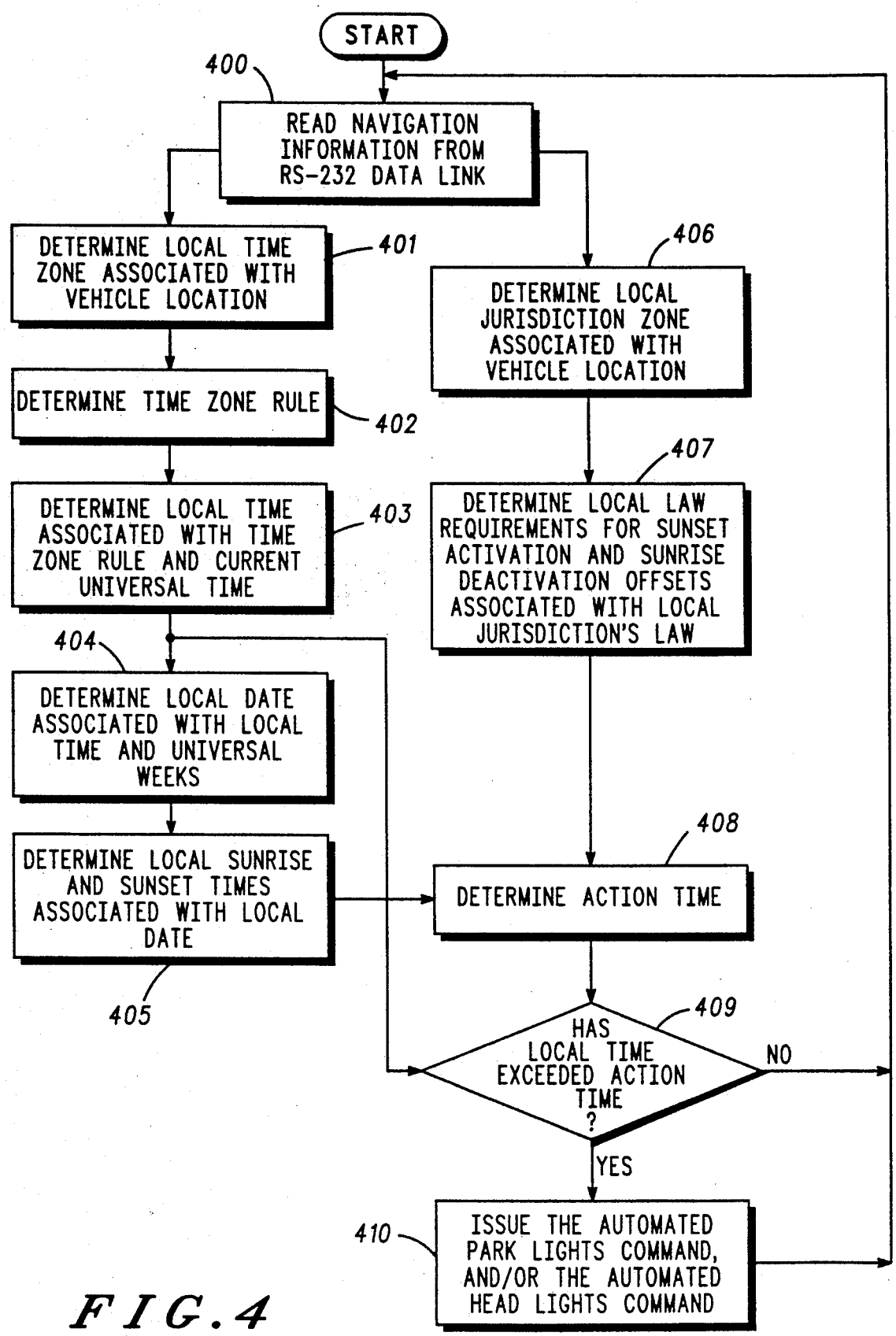
FIG. 4 is a method flow chart showing the sequence of operation of the navigation post processing element of FIG. 3.

Referring to FIG. 4 we find a method flow chart. This chart represents the action taken by the navigation post processing element, 201. It is embodied the program memory, 301.

The first step, 400 is to read the navigation information from the RS-232 data link, 200. This information includes, but is not limited to current vehicle latitude, longitude, Universal Time and Universal Week. Universal time is represented as the current time in seconds from the beginning of the GPS Universal Week (midnight Sunday). The GPS Universal Week is represented as the number of weeks counting from Jan. 6, 1980.

In the next step, 401 we determine the local time zone associated with the vehicle location. For the boundary determination steps, 401 (time zone) and 406 (jurisdiction zone), to determine which time zone and jurisdiction zone is associated with the location of the vehicle, preferably we apply the quad tree method as described by Hanan Samet, in his treatise on spatial data structures (The Design and Analysis of Spatial Data Structures, ADDISON-WESLEY PUBLISHING COMPANY INC. 1990).

The next step, 402 is to determine the time zone rule associated with the local time zone. For instance if the vehicle is located in the United States Central Time Zone then the rule represents the offset in time from Universal Time.

In step 403, we determine the local time associated with the time zone rule and Universal Time. This is done by simply subtracting the time zone rule, stored in the time zone memory, 304 and indexed by the time zone determination, 401, from the Universal Time.

In step 404, we determine the local data associated with the local time and Universal Week.

In step 405, we determine local sunrise and sunset times associated with the local date. Of course as we transit time zones this information is dynamically updated. The local sunrise and sunset times reside in sunset/sunrise memory, 303 and are indexed by the local data determined in step 404.

Concurrently, in step 406, we determine which local jurisdictional zone is associated with the vehicle location. As previously mentioned the quad tree method is applied and this information is dynamically updated.

The next step, 407 is to determine the local law requirements for the sunset activation, and sunrise deactivation time offsets associated with the local jurisdiction's law. Where local law, is defined for the preferred embodiment herein as all the rules of conduct established and enforced by the authority, legislation or custom of a given community or other group with regard to the operation of a vehicle's operating lights. Of course this predetermined control requirement may be a rule based on other considerations than local law. As well this may be a notification requirement rather than a control requirement.

The next step, 408 is to determine action time. This time represents the actual time that the jurisdiction's local law requires the vehicle operating lights to be turned on before sunset and off after sunrise.

In the next step 409, we determine if the local time has exceeded the action time.

If it has, in step 410 we issue the automated park lights command, 304 and/or the automated head lights command, 305. Of course this could be a notification rather than a control step. These signals are in turn presented to the OR gates, 202a and 202b respectively switching the operating status of the lights, 111a and 111b respectively. If not we repeat the steps starting at step 400.

In an alternative embodiment, the local sunrise and sunset time by geographic location and date, and a predetermined lighting requirement based on geographic location and local law are stored or reported through and analyzed in the navigation system 201.

What is claimed is:

1. A location influenced vehicle control system comprising:
    global positioning means for determining a geographic location of a vehicle and a current time local to the geographical location of the vehicle;
    means for providing, responsive to the geographic location and the current local time, a predetermined control requirement; and
    controller means for controlling said vehicle, responsive to the predetermined control requirement, wherein said predetermined control requirement is for controlling headlights of said vehicle and wherein said controller means controls said vehicle's headlights.

2. A location influenced vehicle control system comprising:
    global positioning means for determining a geographic location of a vehicle, and current local time at the determined geographic location of the vehicle;
    means for storing a predetermined control requirement associated with said determined geographic location and said current local time;
    means for recalling from said means for storing, said stored predetermined control requirement in accordance with said determined geographic location of the vehicle and said current local time; and
    controller means for controlling headlights of the vehicle responsive to said stored predetermined control requirement recalled by said means for recalling.

3. A location influenced vehicle control system in accordance with claim 2 wherein said means for storing a predetermined control requirement stores a plurality of control requirements, and wherein said global positioning means for determining a geographic location of said vehicle determines current local date in accordance with the determined geographic location of the vehicle; and wherein said means for recalling, recalls one of the plurality of control requirements dependent on the determined current local date.

4. A location influenced vehicle control system in accordance with claim 2 wherein said global positioning means for determining the geographic location of the vehicle further comprises a GPS Receiver.

5. A method of location influenced vehicle control comprising the steps of:

determining using a global positioning means a geographic location of a vehicle, and current local time at the location of the vehicle;

storing a predetermined control requirement associated with said determined geographic location and said current local time;

recalling said stored predetermined control requirement in accordance with said determined geographic location of the vehicle and current local time; and controlling headlights of the vehicle in response to the predetermined control requirement recalled in said step of recalling.

6. A method of location influenced vehicle control in accordance with claim 5 wherein the step of storing a predetermined control requirement stores a plurality of control requirements, and wherein said step of determining includes determining current local date in accordance with said determined geographic location of the vehicle, and wherein said step of recalling recalls one of the plurality of control requirements dependent on the determined date local to the geographic location of the vehicle.

7. A location influenced vehicle lights control system comprising:

means for determining vehicle data, said data comprising: geographic location and current local time;

means for recalling from storage stored data, said stored data comprising: time zones, sunset and sunrise times, and sunset activation and sunrise deactivation times, responsive to the determined geographic location;

means for comparing said determined current local time to said stored data; and means, responsive to said means for comparing, for switching vehicle lights.

8. A system in accordance with claim 7 wherein said means for recalling from storage further recalls a law, local to the geographic location determined by said means for determining vehicle data, and wherein said means for switching is further responsive to this recalled law.

9. A method of location influenced vehicle lights control comprising the steps of:

determining vehicle data associated with a current geographical location of a vehicle, said data comprising: geographic location and current local time;

recalling from storage stored data, said stored data comprising: time zones, sunset and sunrise times, and sunset activation and sunrise deactivation times, associated with said current geographical location of the vehicle;

comparing said determined current local time to said recalled data; and controlling vehicle lights in response to said step of comparing.

10. A location influenced vehicle lights control system comprising:

global positioning means for determining current geographic location of a vehicle, and a current universal time, and current universal week corresponding to the determined current geographical location of the vehicle;

means for determining a time zone rule local to said determined current geographical location of the vehicle;

means for determining a current local time associated with said determined time zone rule and current universal time;

means for determining current local data associated with said determined current local time and said determined current universal week;

means for determining local sunrise and sunset times associated with said determined current local date;

means for determining a local jurisdiction zone associated with said current geographical location of the vehicle;

means for determining local law requirements for sunset activation and sunrise deactivation offsets associated with said determined local law;

means for determining an action time associated with said determined local sunrise and sunset times and said sunset activation and sunrise deactivation offsets; and vehicle lights controller for controlling headlights of said vehicle, when said determined local time has exceeded said determined action time.

* * * * *